United States Patent [19]

Pesola et al.

[11] Patent Number: 5,271,056
[45] Date of Patent: Dec. 14, 1993

[54] ELECTROMAGNETIC INTERFERENCE SHIELDING CONSTRUCTION IN A RADIO TELEPHONE

[75] Inventors: Mikko Pesola; Timo Saarnimo; Veli-Matti Välimaa, all of Salo; Ari Léman, Pertteli, all of Finland

[73] Assignee: Nokia Mobile Phones Ltd., Salo, Finland

[21] Appl. No.: 666,882

[22] Filed: Mar. 6, 1991

[30] Foreign Application Priority Data

Apr. 12, 1990 [FI] Finland ................ 901894

[51] Int. Cl.⁵ ............ H04M 11/00; H04M 1/00; H04B 1/08
[52] U.S. Cl. ................ 379/58; 379/428; 379/429; 379/433; 455/348
[58] Field of Search ............ 379/58; 455/348; 379/428; 455/90, 117, 128

[56] References Cited

U.S. PATENT DOCUMENTS

| | | | |
|---|---|---|---|
| 4,375,584 | 3/1983 | Muzumdar et al. | 379/428 |
| 5,081,674 | 1/1992 | Wijas et al. | 379/433 |
| 5,107,404 | 4/1992 | Tam | 455/348 |
| 5,130,629 | 7/1992 | Kuhfus | 379/429 |
| 5,157,723 | 10/1992 | McLean | 379/429 |

FOREIGN PATENT DOCUMENTS 2559613 11/1977 Fed. Rep. of Germany ...... 379/429
8503613 8/1985 PCT Int'l Appl. ................ 379/429

OTHER PUBLICATIONS

Motorola, "DYNA TAC Cellular Mobile Telephone" Aug. 31, 1983 Mechanical Parts.

Primary Examiner—Jin F. Ng
Assistant Examiner—William D. Cumming
Attorney, Agent, or Firm—Darby & Darby

[57] ABSTRACT

A frame construction for a radio telephone or the operating device of a radio telephone. The radio telephone comprises a frame on which printed circuit boards containing telephone electronics are secured on both sides of a substantially flat, electrically conductive frame plate. The frame plate together with ground foils of the printed circuit boards form EMI-shielding for the components located on the sides of the printed circuit boards which face the frame plate. The frame plate preferably has a raised edge to which a printed circuit board is secured. Radio telephone housing parts are located on the two sides of the frame plate to form the radio telephone housing.

16 Claims, 4 Drawing Sheets

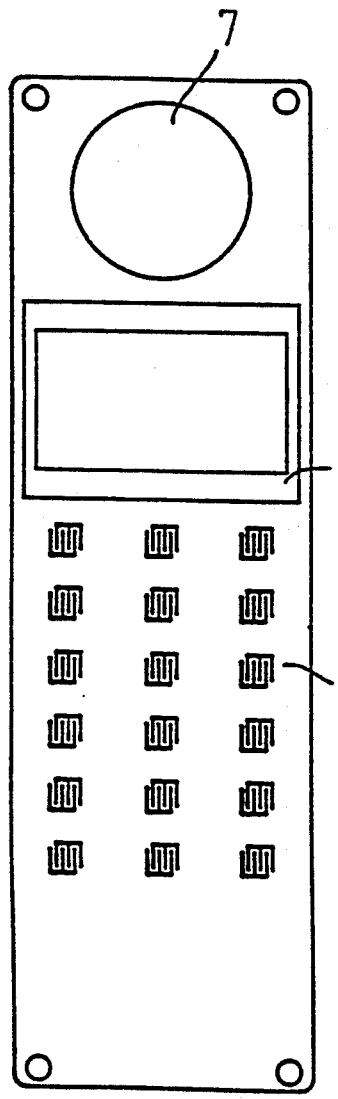
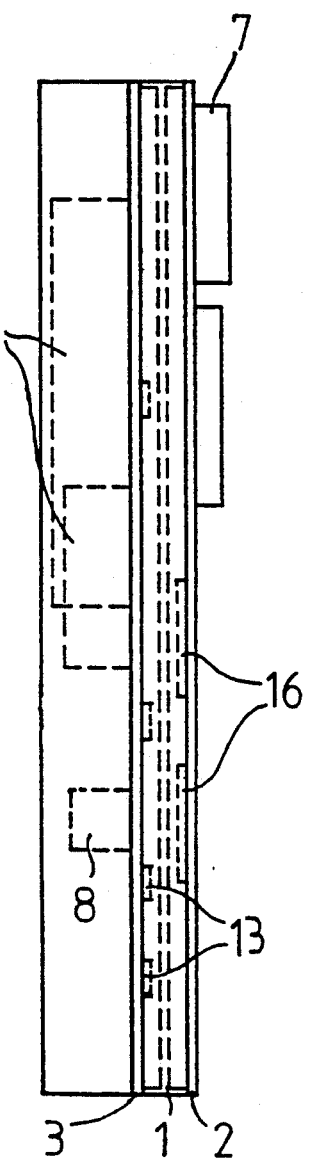
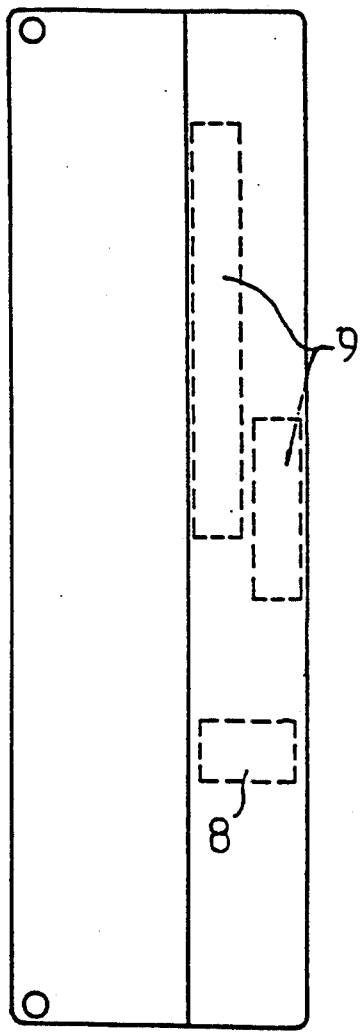
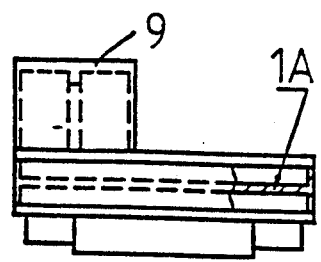

ELECTROMAGNETIC INTERFERENCE SHIELDING CONSTRUCTION IN A RADIO TELEPHONE

BACKGROUND OF THE INVENTION

The present invention relates to the construction of a radio telephone or the operating device of a radio telephone, the radio telephone comprising a frame part to which the printed circuit boards of the telephone electronics are attached.

In conventional radio telephone constructions, the electronic components are divided among a plurality of printed circuit boards, which are located in spaces separated by high partition walls in the frame structure. The frame itself is solid and usually constitutes part of the exterior surface of the apparatus. The EMI-shielding of the electronics is usually implemented using separate metal sheets and metal cases, or metal-coated plastic cases.

The disadvantages of prior-art systems include relatively heavy frames and space-consuming structures. Separate parts require a number of steps in manufacture, and their assembling is also relatively difficult and time-consuming. For example, the fastening of a plurality of separate printed circuit boards is time-consuming, and furthermore, the interconnecting of the printed circuit boards requires a large number of connectors and wiring.

SUMMARY OF THE INVENTION

The object of the present invention is to eliminate a major proportion of the disadvantages of prior-art systems and to provide a radio telephone construction which is simple and economical to manufacture and in which EMI-shielding can be implemented without extra parts and, likewise, the fastening and interconnecting of printed circuit boards is maximally simple and clear.

In order to achieve this object the invention is characterized in that its frame part comprises a substantially flat, electrically conductive frame plate located inside the radio telephone, the printed circuit boards of the telephone being secured to this plate on both of its sides and the parts of the housing of the telephone also being located on both sides around the plate.

According to one preferred embodiment of the invention, on one side of the frame plate there is secured an RF circuit board, and possibly separately any space-consuming RF components, and on the opposite side of the frame plate the logic/audio circuit board.

EMI-shielding is preferably provided so that the components on the printed circuit boards are located primarily on that side which faces the frame plate, the ground foil of the printed circuit board being connected to the frame plate in an electrically conductive manner.

BRIEF DESCRIPTION OF THE DRAWING

These and other characteristics and advantages of the invention are described below in greater detail in the form of examples and with reference to the accompanying drawings, in which FIGS. 2-5 depict the same frame structure, as seen from the top, from the side, from below, and from an end.

DESCRIPTION OF A PREFERRED EMBODIMENT

Figure 1:
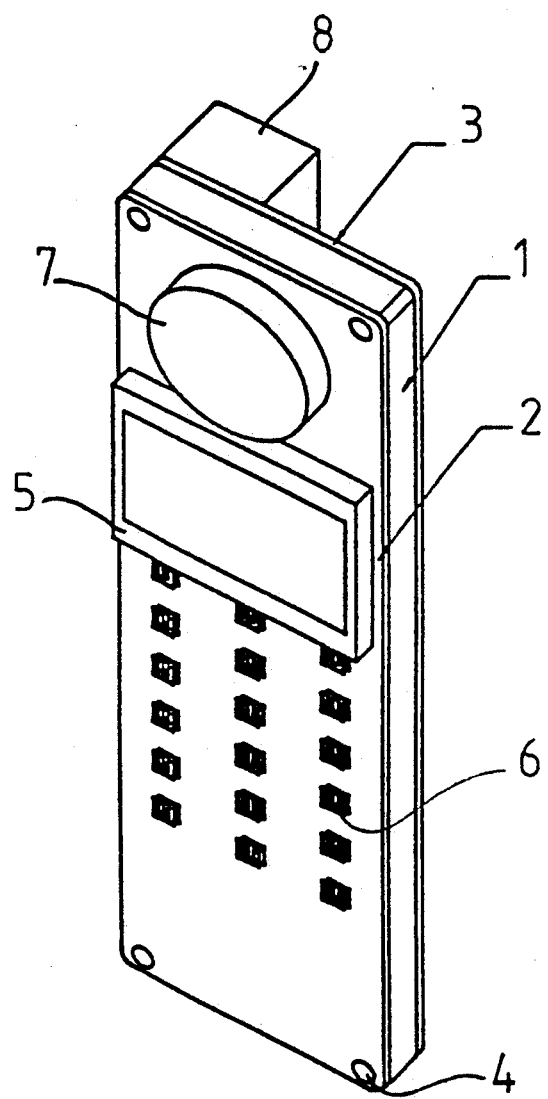
FIG. 1 is a perspective view of the radio telephone frame structure.

FIGS. 1-5 depict a frame part or plate located inside a radio telephone, with housing parts surrounding the frame part. A frame plate 1 of metal or metal-coated plastic has a flat plate part 1A and raised edges 1B around the flat plate part on both sides.

A printed circuit board 2 is secured to the frame plate 1, logic and audio circuits being located on that side of the board 2 which faces the frame plate, and a display 5, keyboard 6, and speaker 7 are located on the side of the board 2 facing outward. A second printed circuit board 3 is secured to the other side of the frame plate 1, with RF electronics being located on that side of the board 3 which faces the frame plate 1. More space-consuming RF-components 8,9 are on the exterior side. As will be described below in greater detail, the frame plate 1, together with ground foils of the printed circuit boards 2,3, constitutes an EMI-shielding for components on the printed circuit boards.

Figure 6:
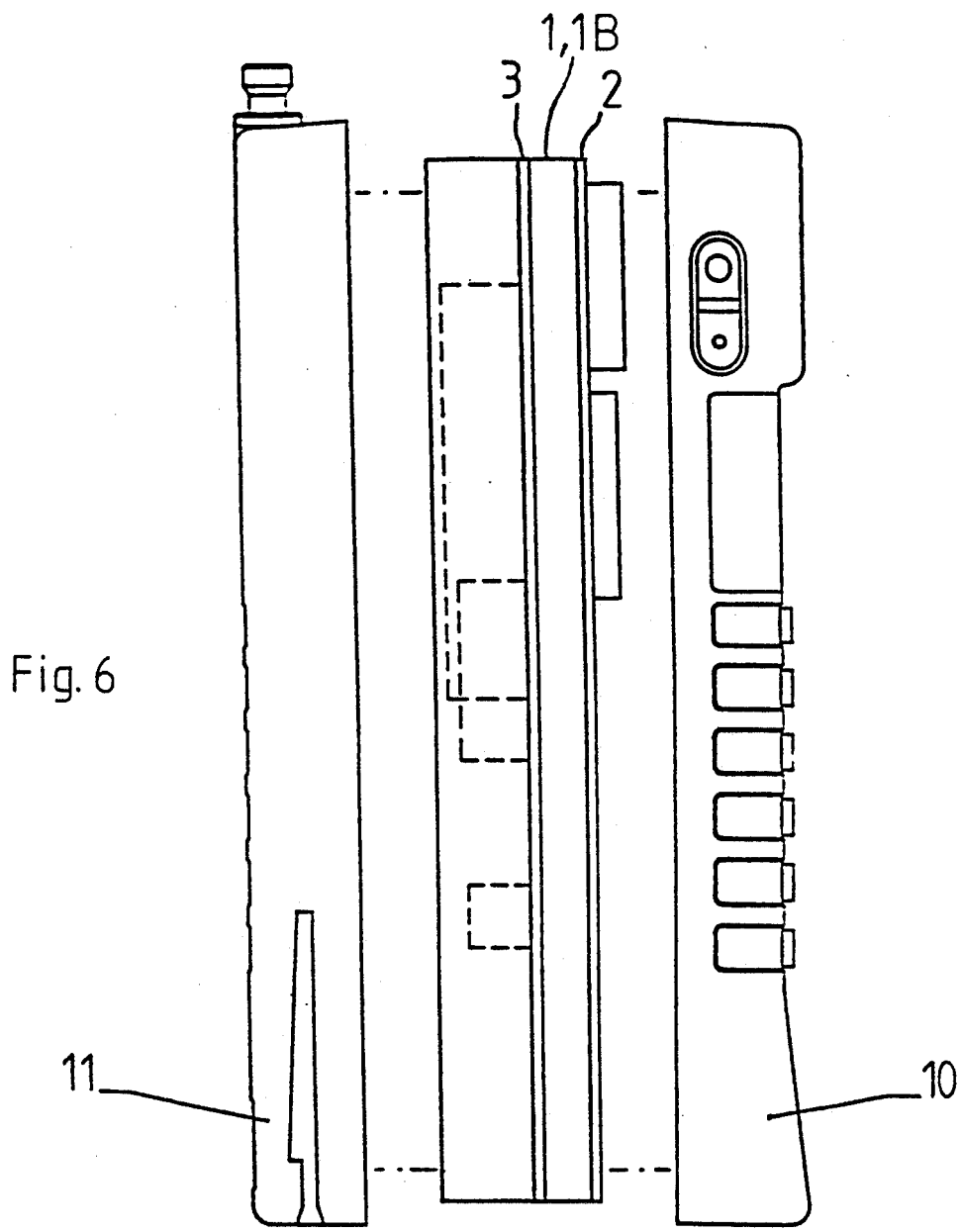
FIGS. 6 and 7 depict, partly exploded, a radio telephone according to the invention with its housing, as seen from the side and from the end, respectively.
Figure 7:
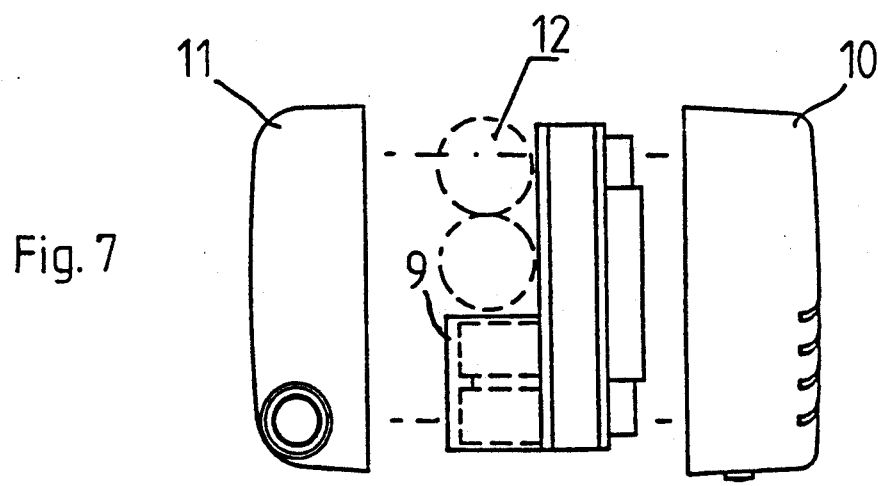

FIGS. 6 and 7 depict side and end views of the whole telephone with housing parts separated from the frame part. The frame plate 1 may, of course, extend all the way to the exterior edge of the telephone, in which case the edge of the frame plate must have a smooth finish. Most preferably, however, the entire frame part is left inside the housing parts 10 and 11, the latter-mentioned parts together forming the entire exterior surface of the radio telephone. The printed circuit boards 2 and 3 in the frame part can be interconnected directly by means of connectors, in which case no extra wires are necessary. Reference number 12 indicates radio telephone batteries, which are located next to the space-consuming RF components 9.

Figure 8:
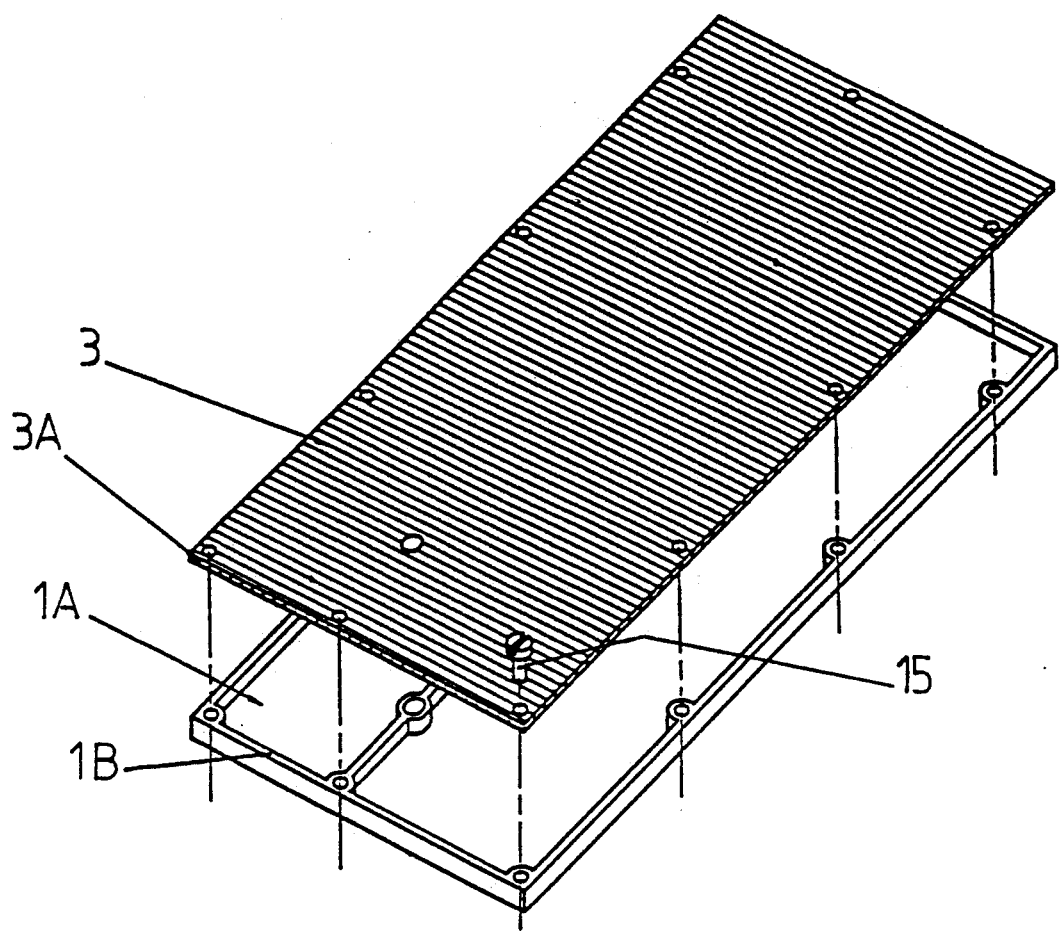
FIG. 8 depicts in greater detail the securing of a printed circuit board to the frame plate.
Figure 9:
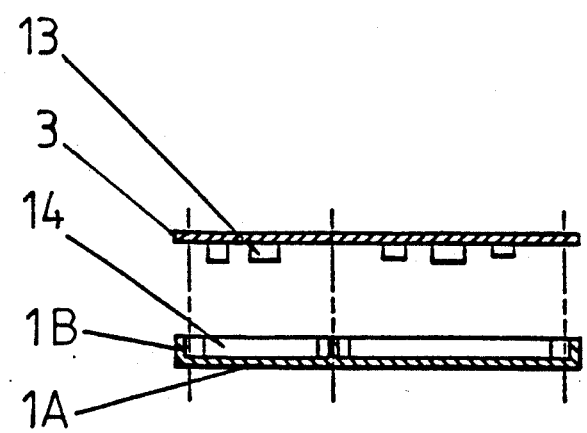
FIG. 9 depicts the printed circuit board and the frame plate, as seen from the end.

The frame plate 1 may be provided with raised edges on both sides of the central plate 1A. However, the essential idea is that at least on the RF side, the frame plate is provided with raised edges 1B, in which case the printed circuit board 3 is secured to the frame plate in such a manner that the ground foil on top of the printed circuit board is connected in an electrically conductive manner, for example by means of screws 15, to the edge of the frame plate, as shown in FIG. 8. In this case the ground foil 3A, which at the edge of the printed circuit board may also be connected to a strip on the component side of the board, will together with the raised edge 1B and the plate 1A form an EMI-shielded case or space 14 for the components 13 on the printed circuit board 3, as shown in FIG. 9.

We claim:

1. A radio telephone containing telephone electronic circuitry and components, comprising:
    an electrically conductive frame including a frame plate with a continuous raised edge surrounding its outer periphery, said frame plate having a first face and an opposed second face;
    a first printed circuit board having a first side substantially covered with a complete ground surface and a second opposed side having at least a first portion of said telephone electronic circuitry and components thereon;

said first circuit board being mounted to said raised edge with said first face of said frame plate opposing said first portion of telephone electronic circuitry and components on said second face of said first circuit board, said ground surface of said first board extending to said raised edge and being electrically joined to said frame to form with said frame an electromagnetic interference shielding for said first portion of telephone electronic circuitry and components on said second side of said first circuit board.

2. A radio telephone as in claim 1, further comprising a second printed circuit board having a first side substantially covered with a ground surface and second opposed side having a second portion of said telephone electronic circuitry and components thereon, said second circuit board being mounted to said frame with said second face of said frame plate opposing said second portion of telephone electronics and components on said second side of said second circuit board, said ground surface of said second circuit board being electrically joined to said frame to form with said frame an electromagnetic interference shielding for said second portion of said electronic circuitry and components on said second surface of said second circuit board.

3. A radio telephone as in claim 2, wherein said first portion on said first printed circuit board includes RF circuitry and RF components of said radio telephone, and said second printed circuit board includes logic and audio circuitry and components of said radio telephone, said circuitry and components on said first board being electromagnetic interference shielded from said circuitry and components on said second circuit board.

4. A radio telephone as in claim 2, further comprising circuit components mounted on said first side of at least one of said printed circuit boards, said circuit components on said at least one first side including a display, keyboard and speaker.

5. A radio telephone as in claim 3, further comprising circuit components mounted on the first side of at least one of said printed circuit boards, said circuit components on said at least one first side including a display, keyboard and speaker.

6. A radio telephone as in claim 1, further comprising housing parts, said housing parts being connected to said frame to define a radio telephone housing enclosing said first printed circuit board.

7. A radio telephone as in claim 2, further comprising housing parts, said housing parts being connected to said frame to define a radio telephone housing enclosing said first and said second printed circuit boards.

8. A radio telephone as in claim 6, wherein said housing encloses said frame.

9. A radio telephone as in claim 7, wherein said housing encloses said frame.

10. A radio telephone or the operating device of a radio telephone as in claim 2, wherein said frame plate has a continuous raised edge on at least said first face, said first circuit board being secured to said raised edge to provide an electromagnetic interference shielded space, which is defined between said frame plate, said raised edge, and the ground surface of said first circuit board.

11. A radio telephone as in claim 1, further comprising electrically conductive screws, said screws contacting said ground surface and connecting said first circuit board to said frame.

12. A radio telephone as in claim 1, wherein said ground surface is a conductive foil.

13. A radio telephone as in claim 2, wherein said ground surface is a conductive foil.

14. A radio telephone as in claim 10, wherein said ground surface is a conductive foil.

15. A radio telephone as in claim 1, wherein said frame plate is substantially flat.

16. A radio telephone as in claim 2, wherein said frame plate is substantially flat.

* * * * *